(12) United States Patent
Houri

(10) Patent No.: US 7,696,923 B2
(45) Date of Patent: Apr. 13, 2010

(54) SYSTEM AND METHOD FOR DETERMINING GEOGRAPHIC LOCATION OF WIRELESS COMPUTING DEVICES

(75) Inventor: Cyril Houri, New York City, NY (US)

(73) Assignee: Mexens Intellectual Property Holding LLC, Miami Beach, FL (US)

( * ) Notice: Subject to any disclaimer, the term of this patent is extended or adjusted under 35 U.S.C. 154(b) by 0 days.

(21) Appl. No.: 11/549,703

(22) Filed: Oct. 16, 2006

(65) Prior Publication Data

US 2007/0126635 A1 Jun. 7, 2007

Related U.S. Application Data

(63) Continuation-in-part of application No. 11/170,337, filed on Jun. 29, 2005.

(60) Provisional application No. 60/649,180, filed on Feb. 3, 2005.

(51) Int. Cl.
*G01S 1/00* (2006.01)
(52) U.S. Cl. .................................. 342/357.09
(58) Field of Classification Search ...... 342/357.01–17, 342/357.09
See application file for complete search history.

(56) References Cited

U.S. PATENT DOCUMENTS

| 5,185,860 | A | 2/1993 | Wu |
| 5,675,741 | A | 10/1997 | Aggarwal et al. |
| 5,835,720 | A | 11/1998 | Nelson et al. |
| 5,944,790 | A | 8/1999 | Levy |
| 5,948,055 | A | 9/1999 | Pulsipher et al. |
| 5,948,061 | A | 9/1999 | Merriman et al. |
| 6,151,631 | A | 11/2000 | Ansell et al. |
| 6,289,341 | B1 | 9/2001 | Barney |
| 6,377,987 | B1 | 4/2002 | Kracht |
| 6,412,014 | B1 | 6/2002 | Ryan |
| 6,425,007 | B1 | 7/2002 | Messinger |
| 6,507,869 | B1 | 1/2003 | Franke et al. |
| 6,508,710 | B1 | 1/2003 | Paravia et al. |
| 6,665,715 | B1 | 12/2003 | Houri |

(Continued)

OTHER PUBLICATIONS

Anthony LaMarca et al., Place Lab: Device Positioning Using Radio Beacons in the Wild, Pervasive 2005, Munich, Germany.
Bill N. Schilit et al., Challenge: Ubiquitous Location-Aware Computing and the "Place Lab" Initiative, Proccedings of the First ACM International Workshop on Wireless Mobil.

(Continued)

*Primary Examiner*—Thomas H Tarcza
*Assistant Examiner*—Harry Liu
(74) *Attorney, Agent, or Firm*—Brian Roffe

(57) ABSTRACT

System for enabling a wireless computing device to determine its position includes a server with a database of identification and positional information about wireless beacons and a wireless computing device arranged to wirelessly communicate using the Internet with the server. The server determines the geographic location of the wireless computing device upon receiving data from the wireless computing device relating to reception of signals by the wireless computing device from at least one wireless beacon and analysis of the signals in light of the information contained in the database of the server. The server applies a calculation algorithm which determines the geographic location of the wireless computing device upon input of identification and signal strength information about the wireless beacon(s) derived from the received signals.

29 Claims, 4 Drawing Sheets

U.S. PATENT DOCUMENTS

| | | | |
|---|---|---|---|
| 6,768,450 B1 | 7/2004 | Walters et al. | |
| 2003/0105818 A1* | 6/2003 | Lapstun et al. | 709/204 |
| 2004/0087317 A1* | 5/2004 | Caci | 455/456.1 |
| 2004/0180645 A1* | 9/2004 | Bussan et al. | 455/404.2 |
| 2004/0203926 A1* | 10/2004 | Ruutu et al. | 455/456.1 |
| 2004/0214550 A1* | 10/2004 | Jenkins | 455/403 |
| 2004/0266457 A1* | 12/2004 | Dupray | 455/456.5 |
| 2005/0136845 A1* | 6/2005 | Masuoka et al. | 455/67.14 |
| 2005/0164704 A1* | 7/2005 | Winsor | 455/432.3 |
| 2005/0212700 A1* | 9/2005 | Diggelen et al. | 342/357.06 |
| 2006/0046749 A1* | 3/2006 | Pomerantz et al. | 455/457 |

OTHER PUBLICATIONS

Yatin Chawathe et al., A Case Study in Building Layered DHT Applications, Jan. 2005.

Yu-Chung Cheng et al., Accuracy Characterization for Metropolitan-scale Wi-Fi Localization, Proceedings of Mobisys 2005, Jan. 2005.

Ian Smith et al., Social Disclosure of Place: From Location Technology to Communication Practices, Pervasive 2005, Munuch, Germany.

Jason I. Hong et al., Privacy and Security in the Location-enhanced World Wide Web, Proceedings of Ubicomp 2003, Seattle, WA, Oct. 2003.

* cited by examiner

FIG. 2
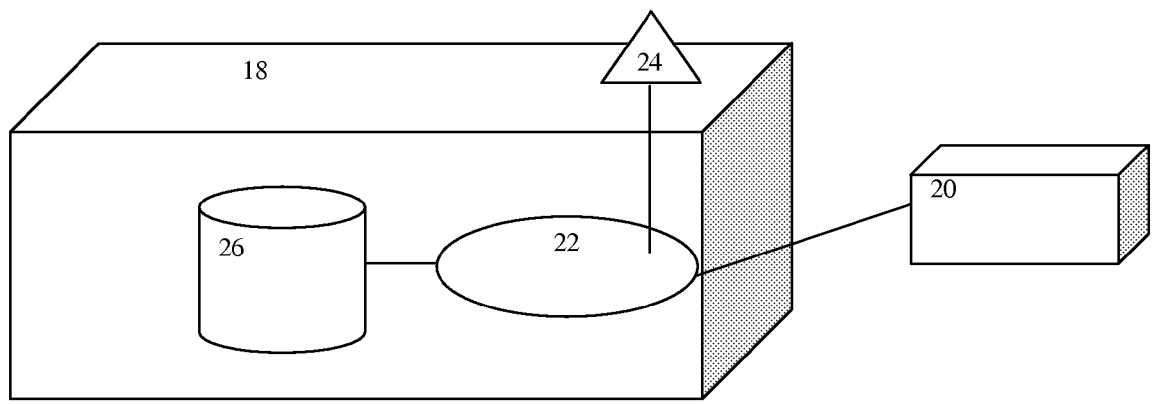
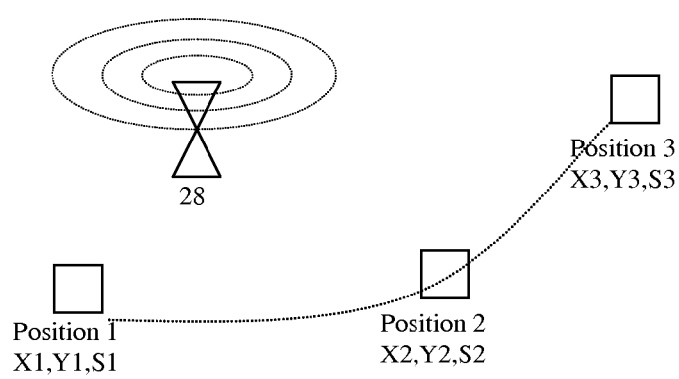
FIG. 3

SYSTEM AND METHOD FOR DETERMINING GEOGRAPHIC LOCATION OF WIRELESS COMPUTING DEVICES

CROSS REFERENCE TO RELATED APPLICATIONS

This application is a continuation-in-part of U.S. patent application Ser. No. 11/170,337 filed Jun. 29, 2005 which claims priority under 35 U.S.C. §119(e) of U.S. provisional patent application Ser. No. 60/649,180 filed Feb. 3, 2005, both of which are incorporated by reference herein.

FIELD OF THE INVENTION

The present invention relates generally to a system and method for enabling a wireless computing device to determine its position using a wireless positioning network, e.g., a satellite-based positioning system.

The present invention also relates to a system and method ascertaining the geographical locations of wireless computing devices based on a database of wireless beacons.

BACKGROUND OF THE INVENTION

As portable wireless computing devices proliferate, there is a growing demand to continuously and accurately know the geographic location of the computing devices. There are basically two different ways to determine the geographic locations of a computing device, either using a wireless positioning network such the GPS system or using a database of wireless beacons and determining position using this database.

The first technique suffers from the difficulty in continuously obtaining signals, e.g., from a network of satellite, to enable the position of the computing device to be determined. It is recognized that such difficulties commonly arise in enclosed areas and confined areas, such as in areas with a large concentration of tall buildings and in tunnels.

The second technique requires the creation of a database of wireless beacons, and the computing device to be within range of a plurality of such wireless beacons. In the absence of wireless beacons within range, the position of the computing device cannot be determined.

For the second technique, several systems are being used to enable wireless computing devices to determine their position. One such system is Place Lab. Place Lab is software providing low-cost, easy-to-use device positioning for location-enhanced computing applications. The Place Lab approach is to allow wireless computing devices such as notebook computers, PDAs and cell phones, to locate themselves by listening for radio beacons such as 802.11 access points, GSM cell phone towers, and fixed Bluetooth devices that exist in the surrounding environment. These beacons all have essentially unique identifications, for example, a MAC address. The devices compute their own location by hearing one or more IDs, looking up the associated beacons' positions in a stored map, and estimating their own position referenced to the beacons' positions. Additional information about Place Lab is found in: Place Lab: Device Positioning Using Radio Beacons in the Wild, by Anthony LaMarca et al., Pervasive 2005, Munich, Germany; Challenge: Ubiquitous Location-Aware Computing and the "Place Lab" Initiative, by Bill N. Schilit et al., Proceedings of The First ACM International Workshop on Wireless Mobile Applications and Services on WLAN (WMASH 2003), San Diego, Calif. September 2003; A Case Study in Building Layered DHT Applications, by Yatin Chawathe et al., January 2005; Accuracy Characterization for Metropolitan-scale Wi-Fi Localization, by Yu-Chung Cheng et al., Proceedings of Mobisys 2005, January 2005; Social Disclosure of Place: From Location Technology to Communication Practices, by Ian Smith et al., Pervasive 2005, Munich, Germany; and Privacy and Security in the Location-enhanced World Wide Web, by Jason I. Hong et al., Proceedings of Ubicomp 2003, Seattle, Wash. October 2003.

Another positioning system is that of Skyhook Wireless which uses a database of known Wi-Fi access points to calculate the precise location of any Wi-Fi enabled device, For this system, known Wi-Fi networks are mapped, e.g., by having hired drivers travel every street in a neighborhood, and a user's location is calculated based on the Wi-Fi networks the Wi-Fi enabled device detects at a given moment using proprietary software. If the device can identify three networks, it can determine its position, e.g., using triangulation. The more networks the device detects simultaneously, the more accurate the locational fix.

It would be desirable to provide a single positioning system for a wireless computing device which is capable of continuously determining the position of the wireless computing device using both a wireless positioning network and a database of wireless beacons to enable optimum positional determination.

OBJECTS AND SUMMARY OF THE INVENTION

It is an object of the present invention to provide a new system and method for enabling a wireless computing device to determine its position using a wireless and/or satellite-based positioning system.

It is yet another object of the present invention to provide a new system and method for geographically locating wireless computing devices using signals broadcast by wireless beacons.

In order to achieve one of the above objects and others, a system for enabling a wireless computing device to determine its position in accordance with the invention includes a server comprising a database of identification and positional information about wireless beacons and a wireless computing device arranged to wirelessly communicate using the Internet with the server. The server determines the geographic location of the wireless computing device upon receiving data from the wireless computing device relating to reception of signals by the wireless computing device from at least one wireless beacon and analysis of the signals in light of the information contained in the server's database. In one embodiment, the server applies a calculation algorithm which determines the geographic location of the wireless computing device upon input of identification and signal strength information about the wireless beacon(s) derived from the received signals.

An advantage of this technique is that the wireless computing device does not have to be GPS enabled to enable a location determination. The wireless computing device can be programmed to display an icon which causes data relating to reception of signals by the wireless computing device from the wireless beacon(s) to be sent to the server upon selection by the user. In this case, the wireless computing device can display the position of the wireless computing device on a portion of a screen of the wireless computing device.

The wireless computing device could also be arranged to continuously or periodically send data relating to reception of signals by the wireless computing device from the wireless beacon(s) to the server upon selection by the user. In this case, the wireless computing device displays an icon which causes the position of the wireless computing device to be displayed upon selection by the user. The wireless computing device can be programmed to display the position of the wireless computing device on a portion of a screen of the wireless computing device.

To encompass all conceivable locations of the wireless computing device, the server can be arranged to provide at a minimum a country identifier as the geographical location of the wireless computing device when the server is unable to determine a region identifier from the signals received by the wireless computing device from at least one wireless beacon. Alternatively, the server can be programmed to provide at a minimum a country identifier and a region identifier as the geographical location of the wireless computing device when the server is unable to determine a more precise location from the signals received by the wireless computing device from at least one wireless beacon.

A method for determining a location of a wireless computing device in accordance with the invention includes providing a server containing a database of identification and positional information about wireless beacons, receiving user input to the user's wireless computing device indicative of a request by the user to obtain information about the position of the user's wireless computing device, directing a transmission from the wireless computing device to the server containing information about reception of signals by the wireless computing device from at least one wireless beacon, and determining at the server the geographic location of the wireless computing device based on the information. The geographical information of the wireless computing device can be used for various purposes, including limiting transmission of information based on location, compilation for statistical analysis, and confirmation of input from the user about their location. In the latter case, the geographic information determined by the server may be compared to information provided by the user.

In one embodiment, a transmission containing the geographic location of the wireless computing device is directed from the server to the wireless computing device and the geographic location of the wireless computing device is displayed to the user, e.g., on a portion of the screen of the user's computing device. The geographical location of the wireless computing device may be displayed only upon receiving user input. An icon can be displayed on a screen of the wireless computing device whereby clicking on the icon constitutes the user input. The transmission from the wireless computing device can thus be directed to the server only upon receiving user input.

Optionally, the information about reception of signals can be generated by the wireless computing device. This information may be identification and signal strength information about the wireless beacon(s) derived from signals from the wireless beacon received by the wireless computing device.

The invention also encompasses a method for enabling establishment of a network of wireless computing device which includes providing a database of identification and positional information about wireless beacons, installing the database in a deployable server, coupling wireless computing devices to the server enable the geographic location of the wireless computing devices to be determined by an operator of the server, and providing third party management of the database including updating of the database.

Other and further objects, advantages and features of the present invention will be understood by reference to the following specification in conjunction with the annexed drawings, wherein like parts have been given like numbers.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 2 is a schematic showing a scanner used to create a database of wireless beacons in accordance with the invention.

FIG. 3 is an illustration of multiple scanner readings obtained to create the database of wireless beacons.

DETAILED DESCRIPTION OF THE INVENTION

Figure 1:
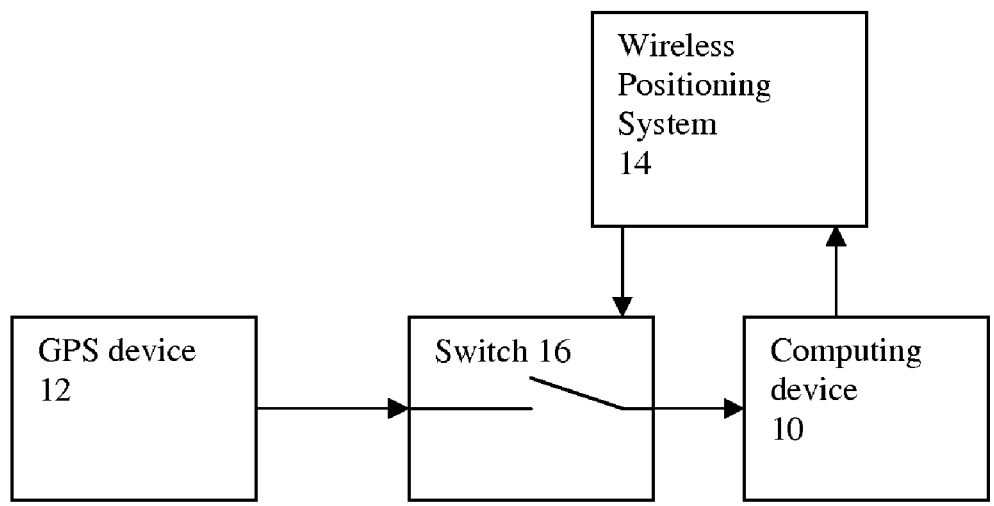
FIG. 1 is a schematic of a general concept used in the invention for enabling position of a wireless computing device to be determined.

Referring first to FIG. 1, to provide a system and method for enabling a wireless computing device to determine its position using a wireless and/or satellite-based positioning system irrespective of the reception of positioning signals therefrom by the computing device, each computing device 10 is coupled to a wireless or satellite-based positioning systems such as a GPS device 12 such that the computing device 10 and GPS device 12 are effectively collocated. Using positional data provided by the GPS device 12 and data about wireless beacons, Wi-Fi access points, cell phone towers or other comparable systems (hereinafter referred to as beacons) within reception range of the computing device 10, the computing device 10 creates a database of wireless beacons within a wireless positioning system 14 including the geographic location of each beacon (the exact manner in which such a database is formed is described below).

A software switch 16 is interposed between the GPS device 12 and the computing device 10 to vary the manner in which a determination by the computing device 10 of its position is made. Specifically, when the GPS device 12 receives an accurate positioning signal, switch 16 would allow this GPS signal to be directed to the computing device 10 so that the computing device would consider its position that determined by the GPS signal. On the other hand, when the GPS device 12 is unable to provide an accurate GPS signal, switch 16 would allow a positioning signal derived from the wireless positioning system 14, and based on input from the computing device 10 at that time, to be directed to the computing device 10 and the computing device 10 would consider its position that indicated by this positioning signal.

Switch 16 would operate to revert back to allowing a GPS signal from GPS device 12 to be directed to computing device 10 once GPS device 12 provides an accurate GPS signal. Accuracy of the GPs signal can be made in a manner known to those skilled in the art.

Accordingly, the computing device 10 would be able to continuously know its position even in the absence of an accurate GPS signal. The computing device 10 could be designed to indicate the source of its positioning signal, e.g., an icon on a screen thereof could indicate either a satellite-derived signal (a signal from GPS device 12) or a database-derived signal (a positioning signal from wireless positioning system 14).

Although represented as separate elements in FIG. 1, this is for the purposes of explanation only and it should be understood that computing device 10 can include wireless positioning system 14 and switch 16 can be software implemented in the computing device 10. Moreover, GPS device 12 can also be incorporated into the computing device 10 so that a single hand-held or portable unit could include the entire system in accordance with this embodiment of the invention.

The database of wireless beacons in wireless positioning system 14 can be considered a map which associates the fixed physical location of each wireless beacon, i.e., where they are geographically located, with a unique or semi-unique identification code of each wireless beacon. The location of each beacon can be expressed, for example, by latitude and longitude, or possibly by another coordinate system.

Construction of such a map may be accomplished in a variety of ways, the simplest but most labor intensive being to place a positioning device, e.g., a GPS device, at the same location of each wireless beacon to thereby obtain the physical location of the wireless beacon from the GPS device. This however is highly impractical in view of the constant addition of wireless beacons and the manpower that would be required.

A preferred and far simpler method would be to collect data about each wireless beacon based on information about the strength of a signal provided by each wireless beacon at a plurality of locations at which a signal from that wireless beacon is being received. Basically, the geographic location of each wireless beacon is determined based on analysis of the signal strength provided by that wireless beacon as a function of geographic location.

To enable such an analysis, a scanner 18 is equipped or collocated with a GPS device 20 and during movement of the scanner 18, a series of readings consisting of the position of the scanner 18, obtained using the GPS device 20, and the strength of the signal received at this position are obtained from a wireless beacon (see FIG. 2). The scanner 18 may be a hand-held computing device such as a PDA or cell phone including a processor having software 22 designed to analyze the signal received via an antenna 24 from every single beacon at different positions and estimate a geographic location thereof. A series of readings for each beacon will be stored in a database 26. Thus, if multiple beacons are being mapped, there will be multiple series of readings.

Referring to FIG. 3, these readings will look like a series of data sets designated (Xi, Yi, Si) where Xi and Yi are the latitude and longitude, respectively, of the position of the scanner 18 and Si is the strength of a signal received at this position from wireless beacon 28. With the scanner 18 at position PI, a reading of (X1,Y1,S1) is obtained, with the scanner 18 at position P2, a reading of (X2,Y2,S2) is obtained and with the scanner 18 at position P3, a reading of (X3,Y3, S3) is obtained.

Figure 4:
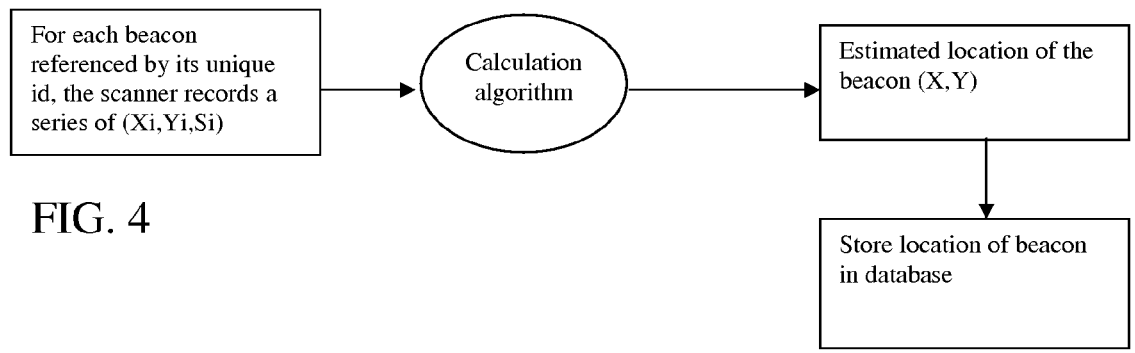
FIG. 4 is a flowchart showing the mapping of wireless beacons from the scanner readings.

Each series of readings, i.e., the readings obtained from each individual beacon 28, recorded by the scanner 18 may be stored in the scanner's memory. To obtain an estimated position of each beacon, the series of readings relating only to that beacon is input to a calculation algorithm 30 that processes the readings to provide as output, an estimated position of the beacon 28 (see FIG. 4). If multiple series of readings are input to the algorithm, then the position of all of the beacons 28 from which readings were obtained will be output.

Note that at each position of the scanner 18, multiple readings can be obtained, one for each beacon 28 in reception range of the scanner 18. These readings can be stored with an identification of the beacon 28 so that the readings can later be combined with other readings from the same beacon 28 in order to determine the location of the beacon 28.

Different calculation algorithms 30 can be used in the invention to process each series of readings into the position of the beacon 28. These include Centroid, triangulation, Newton and the like. An exemplifying calculation algorithm 30, namely the Centroid algorithm, is described below. Generally, regardless of which algorithm 30 is used, approximately the same estimated position of the beacon 28 will be obtained and thus, the invention is not limited to use of any particular algorithm.

It is important to bear in mind that scanner 18 can be and typically is the same as computing device 10 (in which case, GPS device 20 is the same as GPS device 12, the software 22 and database 26 would be part of the wireless positioning system 14 and antenna 24 would be part of the wireless computing device 10). This embodiment will be considered hereinafter. In this case, computing device 10 would not only create and/or update the database 26 of wireless beacons in the wireless positioning system 14 via operation of the scanning software 22 (when GPS signals from GPS device 12, 20 are available) but would also use the same database 26 of wireless beacons it is updating to determine its position in the absence of an accurate GPS signal from the GPS device 12, 20 (when GPS signals from GPS device 12, 20 are not available). Thus, when GPS signals are available and switch 16 is allowing the GPS signal from the GPS device 12, 20 to be directed to the computing device 10, computing device 10 is working as scanner 18 to scan the area around the computing device 10 to determine the presence of (unmapped) wireless beacons and obtain geographic positional information about these unmapped wireless beacons for inclusion in the database 26 of wireless beacons resident in the wireless positioning system 14.

After the estimated position of the beacons is obtained, the final step in creating the database 26 of wireless beacons in wireless positioning system 14 is to store the positions of the beacons 28 in a database in a manner in which the position of the beacon is associated with an identification code. For example, the position of each beacon 28 can be stored in the database 26 in the form (Id, X, Y) where Id is a unique identification associated with or referencing the beacon 28 and X, Y are the latitude and longitude coordinates, respectively, of the beacon 28 as determined in the manner described above.

The database creation step continues whenever a GPS signal is available and the position of the scanner 18 has changed. Thus, when the scanner 18 is the same as computing device 10, movement of the computing device 10 in the presence of a GPS signal from GPS device 12, 20 can results in continuous updating of the database 26 of wireless beacons in wireless positioning system 14.

Figure 5:
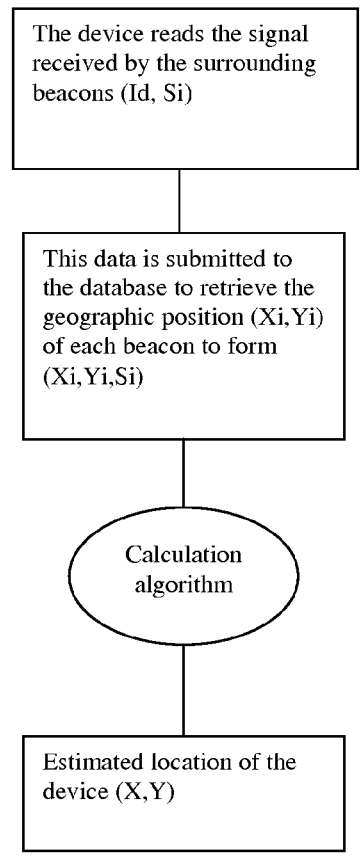
FIG. 5 is a flowchart showing the determination of the position of a computing device based on instantaneously received signals from wireless beacons and the database thereof.

In the exemplifying use described above with respect to FIG. 1, the database 26 of wireless beacons in wireless positioning system 14 is used only when a GPS signal from GPS device 12, 20 is unavailable. At this time, it is necessary to input data into the database 26 to determine the position of the computing device 10. With reference to FIG. 5, determining the position of the computing device 10 using the database 26 of wireless beacons in wireless positioning system 14 entails querying a receiver unit of the computing device 10, i.e., a network adapter or cell antenna 24, to find out which wireless beacon(s) 28 are "visible" and what is the strength of the signal received by the receiver from each wireless beacon 28. Visible beacons 28 are those from which the receiver receives a signal.

From the antenna 24, the computing device 10 will obtain a series of readings each containing the unique identification associated with or referencing one of visible wireless beacons 28 and the strength of the signal from that wireless beacon 28. This series of readings can be expressed in the form of (Id, Si) where Id is the unique identification of the wireless beacon 28 and Si is the signal strength.

The computing device 10 then submits this information to database 26 in wireless positioning system 14 which contains the geographic location of the wireless beacons 28 in association with their identification. Using the data contained in the database 26, the corresponding, estimated geographic location of the wireless beacon 28 is obtained based on its identification contained in the information and is associated with the signal strength.

After the location of the visible beacon(s) 28 associated with the antenna 24 is known, a series of (Xi, Yi, Si) records is provided to the calculation algorithm 30 to estimate the position of the antenna 24, i.e., the position of the computing device 10.

As described above, a calculation algorithm 30 is used to determine the position of a wireless beacon 28 when creating the database 26 of wireless beacons and also to determine the position of the computing device 10 in the absence of a GPS signal from GPS device 12, 20.

When determining the position of a wireless beacon 28 in the mapping mode from the series of readings (Xi,Yi,Si) to determine the position (X,Y) of the wireless beacon 28, the Centroid calculating algorithm averages the latitudes and longitudes recorded and adds the signal strength squared as a weight:

$$X=(S1^{2*}X1+S2^{2*}X2+\ldots+Sn^{2*}X2)/(S1^{2}+S12^{2}+\ldots+Sn^{2})$$

$$Y=(S1^{2*}Y1+S2^{2*}Y2+\ldots+Sn^{2*}Y2)/(S1^{2}+S12^{2}+\ldots+Sn^{2})$$

where X and Y are the estimated position of the beacon 28 and the Si, Xi, Yi the information recorded by the scanner 18.

When estimating the position of the computing device 10 using the same formula, Xi, Yi would be the coordinates of the wireless beacons 28 referenced in the database 26 and Si would be the strength of the signal received from those same wireless beacons 28.

Applying the database mapping technique described above using scanner 18, when incorporated into the wireless computing device 10 with a common GPS device 12, it becomes possible to create a collaborative database. That is, a database which is continually being updated with data about new wireless beacons can be formed. Scanner 18 obtains identification and signal strength data about new, unmapped wireless beacons when the GPS device 12 receives accurate positioning signals and determines the position of the unmapped wireless beacons for inclusion in the database of wireless beacons in the wireless positioning system 14 which is used when accurate GPS signals from GPS device are not available. The same positional information about previously unmapped wireless beacons being directed to the database in the wireless positioning system 14 can also be directed to a central monitoring or administration facility which is charged with the responsibility for providing an accurate database of wireless beacons. The positional information can be forwarded to this facility periodically, such as every 24 hours. In conjunction with an upload of positional information about new wireless beacons, positional information about new wireless beacons obtained from other wireless computing devices 10 can be downloaded from the facility.

The central facility thereby oversees collection of individual contributions to the database, one from each participating (collective) wireless computing device, and disseminates the collection of the individual contributions to all wireless computing devices using the same positioning technique. It must be understood that not all wireless computing devices 10 will be equipped with a scanner 18 in which case, only some wireless computing devices would contribute positional information to the central facility but all wireless computing devices would preferably receive the update of positional information. Since the uploading of the positional information from the wireless computing devices to the central facility and downloading of the positional information from the central facility to the wireless computing devices may be done without involvement of the user, the central and individual databases of wireless beacons can therefore be passively created, updated and disseminated.

Figure 6:
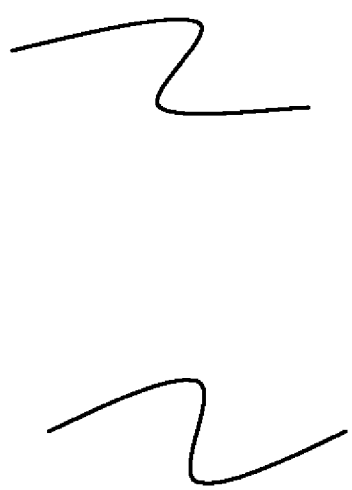
FIG. 6 is a schematic of an embodiment of the invention for enabling a wireless computing device to determine its position.

Database 26 of wireless beacons can be maintained by the central facility and in addition or alternatively, can be installed onto a deployable server, e.g., server 30 of FIG. 6. Such a deployable server 30 can be sold or leased to customers to enable them to continually determine the position of any movable device having an Internet connection under their authority or control, without requiring access to the central facility. The server 30 could be periodically provided with database updates. In this manner, a large company for example, could employ such a server 30 to track its personnel and vehicles having wireless computing devices. By separating the database construction and database use, such a company would not have to concern itself with the scanning feature to create and update the database as described above.

The deployable server 30 could also be operated in conjunction with scanners by the purchaser or lessor of the server 30. That is, a client could have control of both the mapping or scanning functions and the position locating system. A third party could provide management and storage of the database, control access to the database and position location information as per the customer's specification and otherwise relieve the customer of the responsibilities of managing the system.

Another application of the ability to determine the position of a wireless computing device 10 in accordance with the invention, and primarily laptop computers, is the ability to provide an Internet-based service that would almost immediately advise the user of a computing device 32, 34 of their position (see FIG. 6). This service could be formed as a computer software program, downloadable upon request, and installed in the computing device 32, 34. The user's position would be provided either continually, periodically or upon request. The latter implementation is a "query mode" of use of the invention In the query mode, an icon could be created to enable initiation of a positional display so that whenever the user wants to know his or her position, they could click on the icon and their position would be provided (in the manner as described above with reference to FIG. 5). Such an icon could be continually or periodically displayed on the screen and whenever clicked by the user, the user's position would be displayed. A background icon could also be formed. It is important to note that the user's position can be continuously determined and only displayed upon request by the user or the user's position could be both determined and displayed only upon request by the user.

Additionally or alternatively, the program can provide an option to the user to have a section of the screen display the user's position. Such a display may occupy a corner of the screen.

In this scheme, the user of the computing device is able to obtain his or her position even though the computing device is not equipped with a GPS or other satellite-based position determining system (computing device 32). Rather, using only a Wi-Fi connection to the Internet, and specifically a link to a server or site 30 which maintains the database of beacons 26, the user is able to communicate with the site 30 and be provided with their position. Such a service may be a fee-based service wherein the users pay a monthly fee, pay per request for their position, free subject to position-based advertising exposure or any other manner known to those skilled in the art of providing an Internet-based service.

The foregoing description of embodiments of the invention for position determination of wireless computing devices relies on the knowledge of the exact identification details of wireless beacons, including their country identifier, region identifier and cell identification. Thus, when a user requests the position of their wireless computing device, the algorithm can use the beacon information and provide the user's position. However, in some countries or regions of countries, there may be an insufficient number of known beacons in the database, or possibly no beacons in the database, to provide the exact position of the user.

In this case, so long as the wireless computing device is able to connect wirelessly to the Internet using one or more beacons, the program can nevertheless provide a country identifier at a minimum from the data about known beacons in the database, and based on the ability of the wireless computing device to communication with the beacon(s). In addition, often it will be possible to provide the region identifier from the data about known beacons in the database when the wireless computing device is capable of communicating with one or more of the beacons. Although a determination of the user's country identifier and possibly region identifier is often not optimal, it is significantly better that the absence of a determination of any positional information.

The problem may arise when the identification of the beacon with which the wireless computing device is communicating is not known, i.e., is not in the database. The inability to provide accurate positional information will persist until the wireless computing device maps the beacon, if it is able, or the database is updated with information about the unidentified beacon.

Another feature of the system in accordance with the invention is the ability to track wireless computing devices. This feature involves creating a group of authorized users (of wireless computing devices) among which the position of all of the users in the group will be shared, either directly or through a server 30. So long as each user communicates with a wireless beacon, each user's position is determined by the system in the user's wireless computing device and provided through the wireless Internet connection (and possibly the server 30) to the other users in the group. Each user can determine when they want their position to be provided to the other users in the group. This embodiment is operative whenever the user's wireless computing device is GPS-enabled, e.g., computing device 34, and for those users without GPS-enabled wireless computing devices, e.g., computing device 32, it is still operative when they are present in a mapped area and capable of communicating with a server 30 containing the beacon database 26, to enable their position to be determined based on the signals from wireless beacons in the manner described above.

Creation of a group may also be applicable when forming a database of wireless beacons. A group can be created which shares database information among the members of the group prior to forwarding the database updates to the central server 30. In this case, only one member of the group needs to communicate with the central server 30 to provide the update information and receive update information in return. The received update information is them disseminated to the other members of the group. It becomes apparent that only one member of each group is required to communication with the central server 30.

Yet another feature of the system described above is the ability to present to the user information based on their position. For example, once the wireless computing device determines its position in the manner described above, the user can be provided with an entry field to input a desired type of establishment, e.g., coffee shop, hotel, restaurant, pharmacy, and the system will then look up using the Internet connection, one or more closest establishments based on the user's position.

Once the position of wireless computing devices is determined in accordance with the invention, and thus the position of the users' thereof, it becomes possible to use the positional data in various ways. One way is to tailor advertising to the users based on their position. Another way is to provide information about requested types of establishments as described above. Another way is to perform a statistical analysis of the position of users to specific websites. That is, the operator of a website may want information about the location of the people accessing that website and using wireless computing device. The invention can readily provide such information in that it determines the users' locations and can forward that information to the website operator whenever the user is linked to the website.

Yet another way is to use the user's location to limit or restrict transmission of data, i.e., if the user is present in a certain country, transmission of certain data to that country would not be possible. Also, the server's determination of the geographical location of the user's wireless computing device can be used to verify or confirm information about the user's location provided by the user. That is, if the user inputs information indicating they are situated in one place while the server determines they are situated in a different place, transmission of data to the user can be restricted in view of this discrepancy.

Also disclosed above is a system for enabling a wireless computing device to continuously determine its position in accordance with the invention includes a wireless computing device and a wireless positioning system substantially collocated therewith. The wireless positioning system has a first positioning mode in which it communicates with a wireless positioning network to enable the geographic location of the wireless computing device to be determined upon reception of signals from the wireless positioning network and a second positioning mode in which it enables the geographic location of the wireless computing device to be determined upon reception of signals from one or more of the wireless beacons and analysis of the signals in light of positional information about wireless beacons contained in a database. The wireless positioning system switches between the first and second positioning modes to obtain a determination of its geographic location depending on reception of signals from the wireless positioning network. Since the locational information in the first positioning mode, i.e., that from the wireless positioning network, is more accurate, when such information is available it is used and when unavailable, a database-derived location is provided. The switch may be implemented as a software-switch. In the second positioning mode, the wireless beacons provide identification information which is associated with data about the strength of a signal therefrom and received by the wireless computing device. This identification and signal strength data is input into a calculation algorithm which determines the geographic location of the wireless computing device therefrom, the identification information being used to obtain positional information about the wireless beacons which is contained in the database.

To create the database, particularly constructed wireless computing devices are used. Specifically, the wireless computing devices is provided with a scanner arranged to communicate with the wireless positioning network to enable its geographic location to be determined upon reception of signals from the wireless positioning network, for example, coupled to a GPS device. The scanner then obtains positional information about itself and identification and signal strength information about wireless beacons in order to derive the geographic location of the wireless beacons for inclusion in the database, using a calculation algorithm. In particular, software in the scanner analyzes the strength of signals received from the wireless beacons at a plurality of different positions of the scanner and applies an algorithm to determine the position of the wireless beacons therefrom.

A method for enabling a wireless computing device to continuously determine its position in accordance with the invention involves coupling the wireless computing device to a wireless positioning network to enable the geographic location of the wireless computing device to be determined upon reception of signals from the wireless positioning network, providing a database of identification and positional information about wireless beacons and enabling the geographic position of the wireless computing device to be continuously determined by obtaining a position signal derived from the signals from the wireless positioning network upon reception thereof and in the absence of reception of usable signals from the wireless positioning network, deriving a position signal from reception of signals from wireless beacons detected by the wireless computing device and analysis of the received signals using the database. The database is constructed by obtaining identification and signal strength data about each wireless beacon at a plurality of locations at which a signal from that wireless beacon is being received and applying an algorithm to determine positional information about the wireless beacons based on the signal strength data.

A method for administering a database of wireless beacons in accordance with the invention entails maintaining a central database of wireless beacons, providing the central database to a plurality of wireless computing devices, enabling each wireless computing device to determine identification and positional information about wireless beacons not contained in the central database, periodically forwarding the identification and positional information about wireless beacons not contained in the central database from the wireless computing devices to the central database, updating the central database to include the forwarded identification and positional information, and periodically directing the updates of the central database to the plurality of wireless computing devices. Each wireless computing device can be designed to determine identification and positional information about wireless beacons as described above with respect to use of the scanner.

A related embodiment of the invention is a system for enabling a wireless computing device to continuously determine its position in which a central database is provided containing identification and positional information about wireless beacons and receives identification and positional information about wireless beacons not previously contained therein and generates database updates based thereon. Wireless computing devices each include a local database containing positional information about wireless beacons and wirelessly communicate with the central database to receive the database updates and add the database updates to the local database. A wireless positioning system is substantially collocated with each wireless computing device and enable the geographic location of the wireless computing device to be determined upon reception of signals from at least one wireless beacon and analysis of the signals in light of the positional information about wireless beacons contained in the local database. This location determination can be performed in any of the ways described above.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A system for enabling a wireless computing device to determine its position when communicating with one or more wireless beacons having fixed physical locations, comprising:
   a server comprising a database of identification and positional information about wireless beacons having fixed physical locations; and
   a wireless computing device arranged to wirelessly communicate using the Internet with said server,
   said wireless computing device being arranged to directly receive a transmission from at least one wireless beacon and generate identification information about said at least one wireless beacon, the identification information being generated by said wireless computing device based on the transmission from said at least one wireless beacon which is received by said wireless computing device,
   said wireless computing device being arranged to generate a request for a determination of its position and send the position determination request with the generated identification information about said at least one wireless beacon to said server, the generated and sent identification information being the information previously generated by said wireless computing device based on an earlier transmission from said at least one wireless beacon which is received by said wireless computing device,
   said server being arranged to receive the position determination request and the generated information about said at least one wireless beacon sent by said wireless computing device and determine the geographic position of said wireless computing device from the identification information generated and sent by said wireless computing device and the identification and positional information about wireless beacons contained in said database of said server,
   said server being arranged to undertake an action based on the determined geographic position of said wireless computing device.

2. The system of claim 1, wherein said wireless computing device is non-GPS enabled.

3. The system of claim 1, wherein said wireless computing device is arranged to display an icon which when selected, causes the generation of the position determination request and sending of the generated position determination request and the generated identification information about said at least one wireless beacon from said wireless computing device to said server.

4. The system of claim 3, wherein the action undertaken by the server based on the determined geographic position of said wireless computing device is to direct a transmission of the determined geographic position of said wireless computing device to said wireless computing device which generated and sent the information, and said wireless computing device is, upon receipt of the transmission of the determined geographic position from said server, arranged to display the determined geographic position of said wireless computing device on a portion of a screen of said wireless computing device.

5. The system of claim 1, wherein the action undertaken by the server based on the determined geographic position of said wireless computing device is to direct a transmission of the determined geographic position of said wireless computing device to said wireless computing device which generated and sent the information, and said wireless computing device is arranged to continuously or periodically generate the information about said at least one wireless beacon and send the generated information about said at least one wireless beacon to said server upon selection by the user, said wireless computing device being further arranged to display an icon which causes the determined geographic position of said wireless computing device, received in the transmission from said server based on the information generated and sent by said wireless computing device, to be displayed upon selection by the user.

6. The system of claim 5, wherein said wireless computing device is arranged to display the position of the wireless computing device on a portion of a screen of said wireless computing device.

7. The system of claim 1, wherein said server is arranged to provide at a minimum a country identifier as the geographic position of said wireless computing device when said server is unable to determine a region identifier from the transmission received by said wireless computing device from said at least one wireless beacon.

8. The system of claim 1, wherein said server is arranged to provide at a minimum a country identifier and a region identifier as the geographic position of said wireless computing device when said server is unable to determine a more precise position from the transmission received by said wireless computing device from said at least one wireless beacon.

9. The system of claim 1, said wireless computing device includes a scanner arranged to obtain positional information about itself and identification and signal strength information about wireless beacons, whose positional information is not present in said database, in order to derive positional information about at least one such identified wireless beacon from the signal strength information to enable the derived positional information to be included in said database.

10. The system of claim 9, wherein said scanner is arranged to analyze strength of signals received from the wireless beacons at a plurality of different positions of said scanner and apply an algorithm to determine the positional information about the wireless beacons therefrom.

11. The system of claim 9, wherein said scanner is arranged to obtain identification and signal strength information about the wireless beacons, whose positional information is not present in said database, at a plurality of different locations and derive positional information for each identified wireless beacon from the signal strength information at the plurality of different locations.

12. The system of claim 1, wherein said at least one wireless beacon comprises a plurality of wireless beacons and the information about said wireless beacons that said wireless computing device is arranged to generate from the transmission from said wireless beacons is identification information about said wireless beacons,
    said wireless computing device being arranged to send the generate identification information about said wireless beacons to said server,
    said server being arranged to determine the geographic position of said wireless computing device from the identification information generated and sent by said wireless computing device and identification and positional information about wireless beacons contained in said database of said server.

13. The system of claim 1, wherein said at least one wireless beacon comprises a plurality of wireless beacons and the information about said wireless beacons that said wireless computing device is arranged to generate from the transmission from said wireless beacons is identification information about said wireless beacons and signal strength information about the strength of a signal being transmitted by said wireless beacons and received by said wireless computing device,
    said wireless computing device being arranged to send the generated identification information about said wireless beacons and signal strength information to said server,
    said server being arranged to determine the geographic position of said wireless computing device from the identification and signal strength information generated and sent by said wireless computing device and identification and positional information about wireless beacons contained in said database of said server.

14. The system of claim 13, wherein said server is arranged to apply a calculation algorithm which determines the geographic position of said wireless computing device upon input of the identification and signal strength information sent by said wireless computing device.

15. The system of claim 1, wherein the action undertaken by the server based on the determined geographic position of said wireless computing device is to direct a transmission of the determined geographic position of said wireless computing device to said wireless computing device which generated and sent the information.

16. A method for determining a position of a wireless computing device when communicating with one or more wireless beacons having fixed physical locations, comprising:
    providing a server containing a database of identification and positional information about wireless beacons having fixed physical locations;
    generating at the wireless computing device, identification information about at least one wireless beacon transmitting directly to the wireless computing device, the identification information being generated by the wireless computing device based on the transmission from the at least one wireless beacon which is received by the wireless computing device;
    generating a request at the wireless computing device for a determination of the position of the wireless computing device;
    directing a transmission from the wireless computing device to the server, the transmission containing the position determination request and the generated identification information about the at least one wireless beacon, the generated identification information being the information previously generated by the wireless computing device based on an earlier transmission from the at least one wireless beacon which is received by the wireless computing device;

receiving at the server the position determination request and the generated identification information about the at least one wireless beacon sent from the wireless computing device; and then determining at the server the geographic position of the wireless computing device from the identification information generated and sent by the wireless computing device and the database of identification and positional information about wireless beacons contained in the server.

17. The method of claim 16, wherein identification information about a plurality of wireless beacons, each directly communicating with the wireless computing device, is generated at the wireless computing device from a transmission from each of the wireless beacons, respectively, the transmission directed from the wireless computing device to the server contains the generated identification information about each of the wireless beacons.

18. The method of claim 16, wherein the transmission from the wireless computing device is directed to the server only upon receiving user input.

19. The method of claim 16, further comprising:

directing input from the user relating to the user's position; and confirming the user input position by comparing the user input position to the position determined at the server.

20. The method of claim 16, further comprising building a database at the server for use in determining the geographic position of the wireless computing device based on the information generated and sent by the wireless computing device, by using the wireless computing device to generate identification and signal strength information about wireless beacons at a plurality of locations at which a signal from each wireless beacon is being received, applying an algorithm to determine positional information about the wireless beacons based on the signal strength information generated by the wireless computing device, and including in the database, the determined positional information about wireless beacons not already included in the database along with identification information about the wireless beacons.

21. The method of claim 16, further comprising building a database at the server for use in determining the geographic position of the wireless computing device based on the information generated and sent by the wireless computing device, by using a plurality of wireless computing devices to generate identification and signal strength information about wireless beacons at a plurality of locations at which a signal from each wireless beacon is being received, applying an algorithm to determine positional information about the wireless beacons based on the signal strength information generated by the wireless computing device, transmitting from the plurality of wireless computing devices, the determined positional information about wireless beacons not already included in the database along with identification information about the wireless beacons, and including the transmitted information into the database.

22. The method of claim 9, wherein the step of using the determined geographic position of the wireless computing device comprises directing a transmission of the determined geographic position of the wireless computing device from the server to the wireless computing device from which the transmission containing the position determination request and the generated information about the at least one wireless beacon was directed.

23. The method of claim 22, further comprising displaying the geographic position of the wireless computing device to the user on the user's wireless computing device after receipt of the transmission of the determined geographic position of the wireless computing device from the server to the wireless computing device.

24. The method of claim 23, wherein the geographical position of the wireless computing device is displayed only upon receiving user input.

25. A method for enabling establishment of a network of wireless computing devices, comprising:

providing a database of identification and positional information about wireless beacons having fixed physical locations;

installing the database in a deployable server;

coupling wireless computing devices to the server;

generating at each wireless computing device, identification information about at least one wireless beacon transmitting directly to the wireless computing device, the identification information being previously generated by the wireless computing device based on an earlier transmission from the at least one wireless beacon which is received by the wireless computing device;

generating a request at at least one of the wireless computing devices for a determination of the position of that wireless computing device;

directing a transmission from each wireless computing device to the server, the transmission containing the position determination request and the generated identification information about the at least one wireless beacon, the generated identification information being the information generated by the wireless computing device from the transmission from the at least one wireless beacon;

receiving at the server the position determination request and the generated information about the at least one wireless beacon sent from each wireless computing device; then determining the geographic position of each of the wireless computing devices at the server from the identification information generated and sent by each wireless computing device to the server and the identification and positional information about wireless beacons in the database; and providing third party management of the database including updating of the database.

26. The method of claim 16, further comprising receiving user input to the user's wireless computing device indicative of a request by the user to obtain information about the position of the user's wireless computing device.

27. The method of claim 26, further comprising displaying an icon on a screen of the wireless computing device such that clicking on the icon constitutes the user input.

28. The method of claim 25, further comprising generating at the wireless computing device, signal strength information about the strength of a signal being transmitted by the at least one wireless beacon and received by the wireless computing device, the information generated at each wireless computing device including the identification information about the wireless beacon transmitting directly to the wireless computing device and the signal strength information, the transmission being directed to the server from the wireless computing device containing the generated identification information about the wireless beacons and the signal strength information, the geographic position of each of the wireless computing devices being determined at the server from the identification information and signal strength information generated and sent by each wireless computing device to the server and the identification and positional information about wireless beacons in the database.

29. The method of claim 25, further comprising directing a transmission of the determined geographic position of each wireless computing device from the server to that wireless computing device.

* * * * *